US011226692B1

(12) United States Patent
Su et al.

(10) Patent No.: US 11,226,692 B1
(45) Date of Patent: Jan. 18, 2022

(54) KNOB DEVICE APPLICABLE TO TOUCH PANEL

(71) Applicant: HIMAX TECHNOLOGIES LIMITED, Tainan (TW)

(72) Inventors: Chun-Jen Su, Tainan (TW); Chun-Kai Chuang, Tainan (TW); Cheng-Hung Tsai, Tainan (TW); Wai-Pan Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/160,303

(22) Filed: Jan. 27, 2021

Related U.S. Application Data

(60) Provisional application No. 63/051,904, filed on Jul. 15, 2020.

(51) Int. Cl.
*G06F 3/0362* (2013.01)
*G06F 3/041* (2006.01)

(52) U.S. Cl.
CPC ............ *G06F 3/0362* (2013.01); *G06F 3/041* (2013.01); *G06F 2203/04105* (2013.01)

(58) Field of Classification Search
CPC .................. G06F 3/0362; G06F 3/041; G06F 2203/04105
See application file for complete search history.

(56) References Cited

U.S. PATENT DOCUMENTS

| 10,635,201 B2 | 4/2020 | Ballan | |
| 2008/0110739 A1* | 5/2008 | Peng | G06F 3/03547 200/5 R |
| 2020/0073487 A1 | 3/2020 | Ballan | |
| 2020/0073513 A1 | 3/2020 | Ballan | |

FOREIGN PATENT DOCUMENTS

EP    3 617 854 A1    3/2020

* cited by examiner

*Primary Examiner* — Charles V Hicks
(74) *Attorney, Agent, or Firm* — Winston Hsu

(57) ABSTRACT

A knob device is applicable to a touch panel. The knob device includes a knob cover; and a rotation sensing element. The rotation sensing element includes a base and a plurality of sensing pads connected to the knob cover. The rotation sensing element is arranged between the touch panel and the knob cover. The base is connected to the knob cover. When a user touches the knob device, the touch panel generates a rotation sensing signal in response to a location of the plurality of sensing pads. An orthographic projection of the knob cover on the touch panel is divided into a plurality of parts, the plurality of parts are distributed radially from a center of the orthographic projection of the knob cover, each sensing pad is located in a part and connected to another sensing pad located in another part adjacent to the part.

14 Claims, 8 Drawing Sheets

KNOB DEVICE APPLICABLE TO TOUCH PANEL

CROSS REFERENCE TO RELATED APPLICATIONS

This application claims priority to U.S. Provisional Patent Application No. 63/051,904, filed on Jul. 15, 2020, the disclosure of which is incorporated herein by reference in its entirety.

BACKGROUND OF THE INVENTION

1. Field of the Invention

The present invention relates to a user interface (UI) mechanism design, and more particularly, to a knob device applicable to a touch panel.

2. Description of the Prior Art

Knob devices are often used in general electronic apparatus, such as the knob for volume adjustment on an audio player, the knob for frequency adjustment on a radio and the knob for air conditioning/air volume adjustment on a car console, where many of these electronic apparatuses are equipped a touch panel. Therefore, how to integrate the knob device and the touch panel to assist user in control has become an issue. In some traditional methods, the glass of the touch panel has holes on which the knobs are mounted. However, digging holes in the glass has disadvantages such as complicated steps, high cost and reduced glass strength. In some other traditional methods, the touch pad is installed in the knob and then directly mounted on the touch panel, and the function of the knob is achieved by touch effect of the touch pad on the touch panel. For example, when a user rotates the knob, a finger and the touch pad form a loop with the touch panel, such that a cell of the touch panel touched by the touch pad sends a touch signal. According to touch signals of different cells of the touch panel, the angle of rotation of the knob can be captured. However, certain problems may occur. For example, the resolution of the touch panel may be insufficient when the knob is small. For another example, when the touch pad of the knob is located between two touch panel cells, it is difficult to determine its position. Therefore, there is a need for a novel method and associated architecture to improve the resolution of rotation of the knob on the touch panel for solving the problems without introducing any side effect or in a way that is less likely to introduce a side effect.

SUMMARY OF THE INVENTION

It is an objective of the present invention to provide a knob device applicable to a touch panel, in order to solve the above-mentioned problems.

According to one embodiment of the present invention, a knob device is applicable to a touch panel. The knob device comprises a knob cover; and a rotation sensing element. The rotation sensing element comprises a base and a plurality of sensing pads arranged on at least one of the knob cover and the base. The rotation sensing element is arranged between the touch panel and the knob cover. The base is connected to the knob cover. When a user touches the knob device, the touch panel generates a rotation sensing signal in response to a location of the plurality of sensing pads. An orthographic projection of the knob cover on the touch panel is divided into a plurality of parts, the plurality of parts are distributed radially from a center of the orthographic projection of the knob cover, each sensing pad is located in a part and connected to another sensing pad located in another part adjacent to the part.

According to another embodiment of the present invention, a knob device is applicable to a touch panel. The knob device comprises a knob cover and a rotation sensing element. The rotation sensing element comprises a base and a plurality of sensing pads arranged on at least one of the knob cover and the base. The rotation sensing element is arranged between the touch panel and the knob cover, the base is connected to the knob cover. When a user touches the knob device, the touch panel generates a rotation sensing signal in response to a location of the plurality of sensing pads. An orthographic projection of the knob cover on the touch panel is divided into a plurality of parts, the plurality of parts are distributed radially from a center of the orthographic projection of the knob cover. Each sensing pad is located in a part and not connected to another sensing pad, a gap part of the plurality of parts of the orthographic projection of the knob cover is located between two of the plurality of sensing pads.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
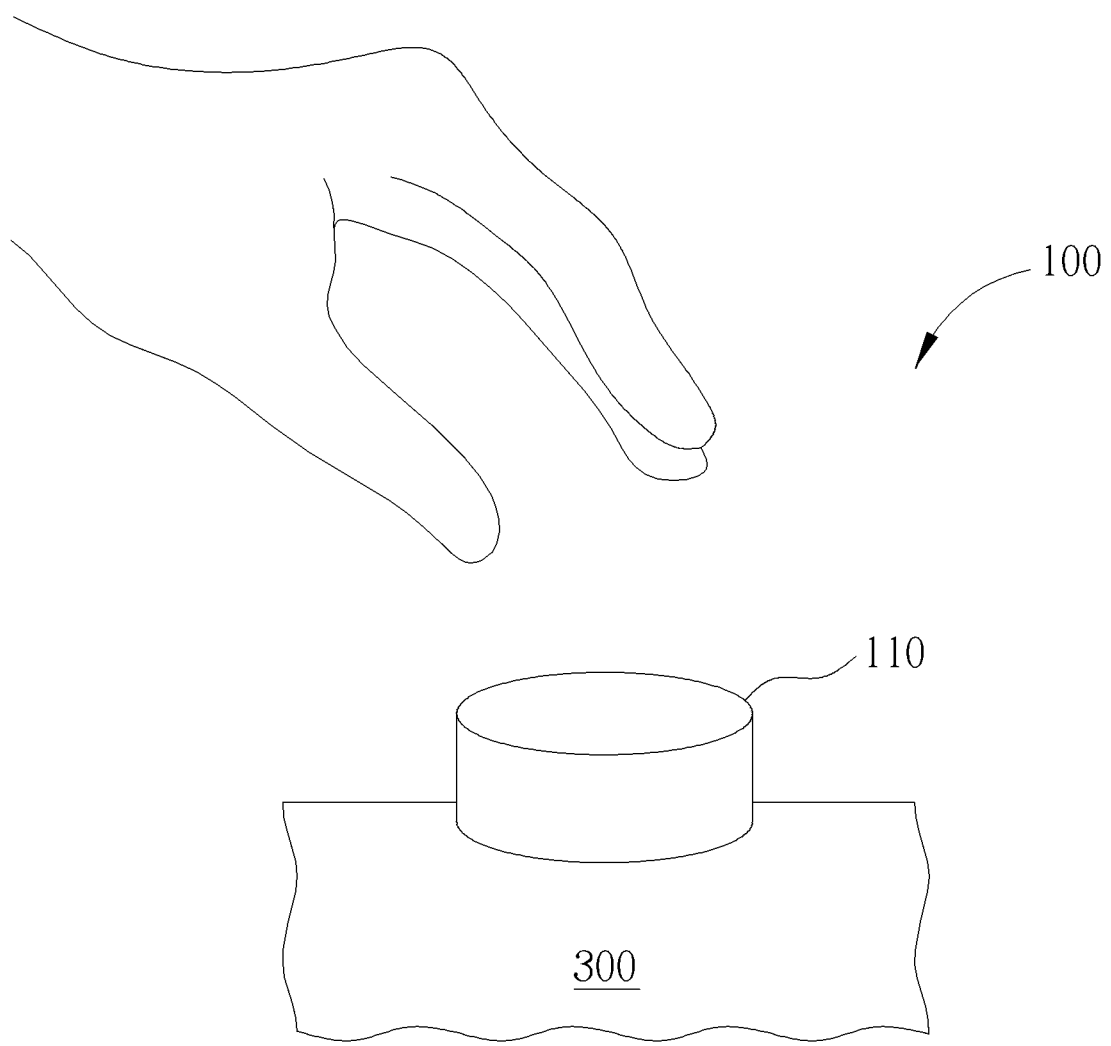
FIG. 1 is a diagram of a knob device arranged on a touch panel according to an embodiment of the present invention.
Figure 2:
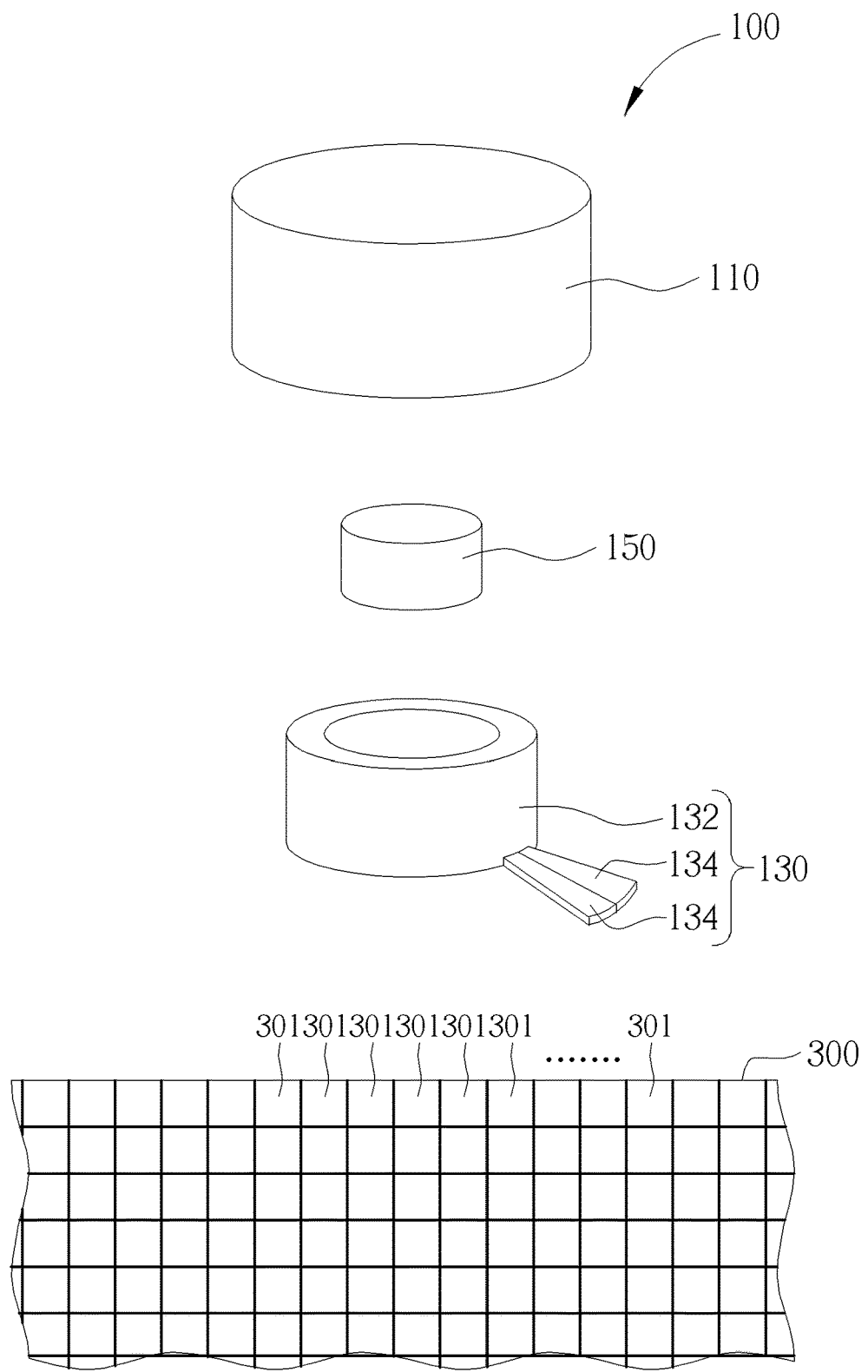
FIG. 2 is an exploded view illustrating the knob device arranged on the touch panel according to a first embodiment of the present invention.

Please refer to FIG. 1 in conjunction with FIG. 2. FIG. 1 is a diagram of a knob device 100 arranged on a touch panel 300 according to an embodiment of the present invention. FIG. 2 is an exploded view illustrating the knob device 100 arranged on the touch panel 300 according to a first embodiment of the present invention. As shown in FIG. 1, the knob device 100 comprises a knob cover 110 arranged on the touch panel 300. When a user operates the knob device 100 by contacting the knob cover 110, the knob cover 110 and a sensing pad are electrically connected to each other to form a conductive path. This path allows the user's finger touching the knob device 100 to be connected to the touch panel 300 through the conductive path, which is equivalent to allowing the user to indirectly control the touch panel 300. In other words, when the user touches the knob cover 110 of the knob device 100, the touch panel 300 generates a sensing signal in response to a loop formed by the touch panel 300, the knob device 100 and the user. Furthermore, when the user rotates or presses the knob cover 110 of the knob device 100, the touch panel 300 generates different sensing signals in response to the movement and location of the knob device 100. As shown in FIG. 2, the knob device 100 comprises a rotation sensing element 130 and a pressing sensing element 150 both arranged between the touch panel 300 and the knob cover 110. The rotation sensing element 130 comprises a plurality of sensing pads 134 and a base 132. In the present embodiment, the rotation sensing element 130 has two adjacent sensing pads 134, but the present invention is not limited thereto. The base 132 is connected to the knob cover 110. The plurality of sensing pads 134 may be arranged on the base 132 and/or the knob cover 110. In the first embodiment, the plurality of sensing pads 134 are shown arranged on the base 132 for better understanding of technical features of the present invention. In addition, the touch panel 300 has multiple touch panel cells 301 arranged in a matrix format. When the user touches the knob cover 110, the touch panel cell (s) 301 under the plurality of sensing pads 134 generate sensing signal(s) in response to a location of the plurality of sensing pads 134. For example, based on the sensing signal(s) output from the touch panel cell(s) 301, the touch panel 300 generates a rotation sensing signal in response to the user touching and rotating knob cover 110 of the knob device 100.

Figure 3:
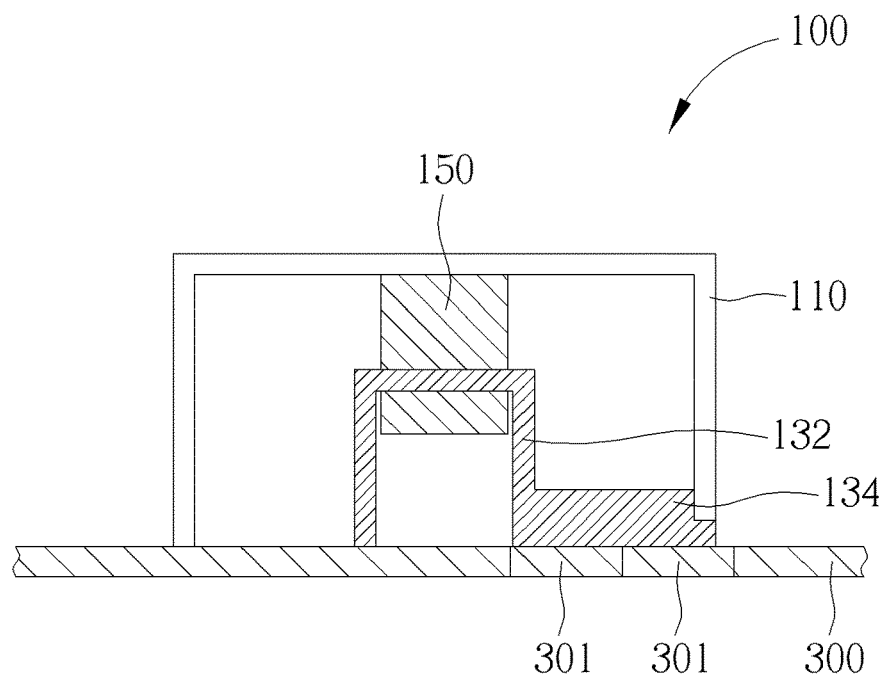
FIG. 3 is a cross-sectional view illustrating the knob device arranged on the touch panel according to the first embodiment of the present invention.

Please refer to FIG. 3. FIG. 3 is a cross-sectional view illustrating the knob device 100 arranged on the touch panel 300 according to the first embodiment of the present invention. As shown in FIG. 3, the plurality of sensing pads 134 are arranged above the touch panel 300, and abut against or get close to the touch panel 300. In the present embodiment, the plurality of sensing pads 134 abut against the touch panel 300, but the present invention is not limited thereto. The pressing sensing element 150 may be connected to the knob cover 110 and/or the base 300. In the present embodiment, the pressing sensing element 150 is shown connected to the knob cover 110 for better understanding of technical features of the present invention. When the user touches and presses the knob cover 110 of the knob device 100, the pressing sensing element 150 abuts against or gets close to the touch panel 300, such that the touch panel cell (s) 301 under the pressing sensing element 150 generate pressing sensing signal (s) in response to the pressing sensing element 150. For example, based on the pressing sensing signal(s) output from the touch panel cell (s) 301, the touch panel 300 generates a pressing sensing signal in response to the user touching and pressing the knob cover 110 of the knob device 100.

Furthermore, when the user touches and rotates the knob cover 110 of the knob device 100, the touch panel cell(s) 301 under the plurality of sensing pads 134 generate sensing signal (s) in response to a location of the plurality of sensing pads 134. It is noticed that, the knob cover 110 has a mechanism (e.g., a spring) that allows the knob cover 110 to be pressed down and rebound up when not being pressed. This mechanism is known to those skilled in the art, so the mechanism is not shown in figures, and further description is omitted here for simplicity.

Figure 4:
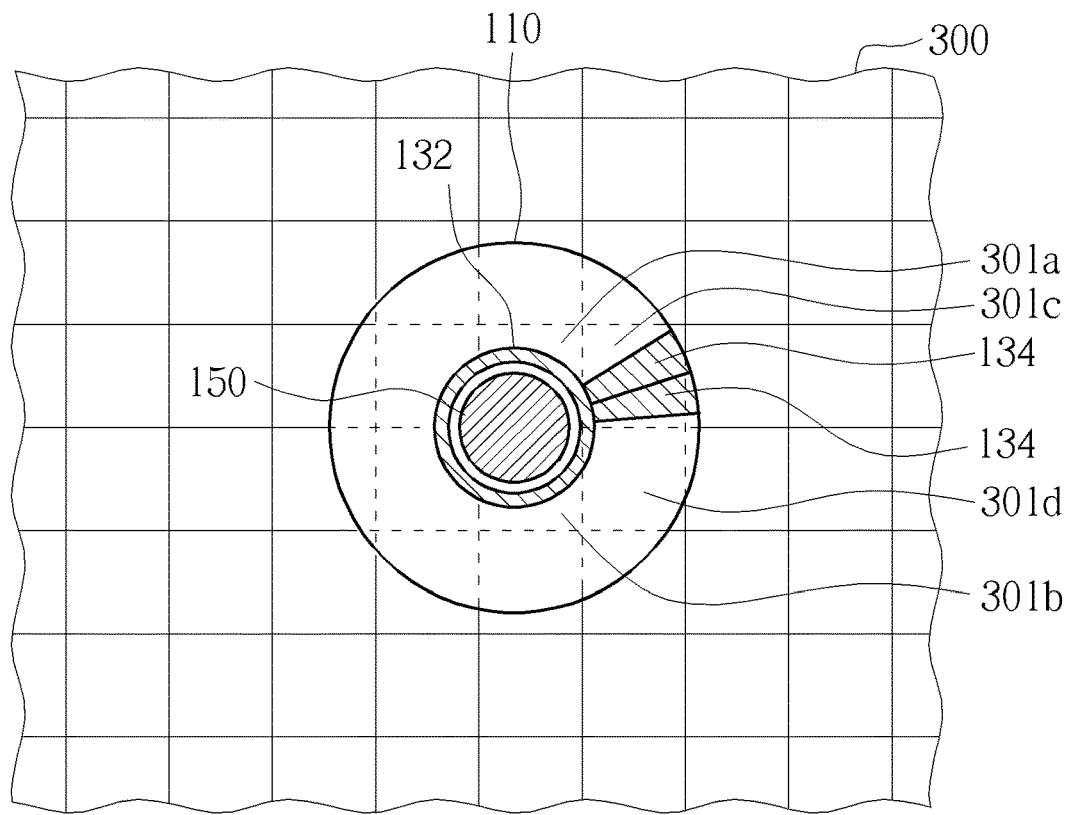
FIG. 4 is a top view illustrating the knob device arranged on the touch panel according to the first embodiment of the present invention.

For example, please refer to FIG. 4. FIG. 4 is a top view illustrating the knob device 100 arranged on the touch panel 300 according to the first embodiment of the present invention. Assume that when the user touches and presses the knob cover 110 of the knob device 100, two touch panel cells 301a and 301b are under the pressing sensing element 150. As shown in FIG. 4, two touch panel cells 301a and 301b generate two sensing signals due to the pressing sensing element 150 directly above the touch panel cells 301a and 301b. The touch panel 300 (particularly, a controller of the touch panel 300) can be pre-programed for generating the pressing sensing signal when receiving two sensing signals generated from two touch panel cells (e.g., touch panel cells 301a and 301b in this embodiment). Similarly, when the user touches the knob cover 110 of the knob device 100, a touch panel cell 301c is under the plurality of sensing pads 134, such that the touch panel cell 301c generates a sensing signal which represents that the knob device 100 is touched. If the user rotates the knob cover 110 of the knob device 100 clockwise, the plurality of sensing pads 134 is moved to a position above a touch panel cell 301d, such that the touch panel cell 301d is under the plurality of sensing pads 134 and generates a sensing signal. The touch panel 300 (particularly, a controller of the touch panel 300) can be pre-programed for generating a rotation sensing signal which represents that the knob device 100 is rotated when firstly receiving a sensing signal generated from one touch panel cell (e.g., touch panel cell 301c in this embodiment) and then receiving a sensing signal generated from another touch panel cell (e.g., touch panel cell 301d in this embodiment). It is noticed that if the plurality of sensing pads 134 cover more touch panel cells 301, different touch panel cells 301 can be touched even if the rotation angle of the knob device 100 is small, such that the small rotation angle can be obtained successfully. In other words, when the plurality of sensing pads 134 cover more touch panel cells 301, the resolution of the rotation angle of the knob device 100 can be higher.

Figure 5:
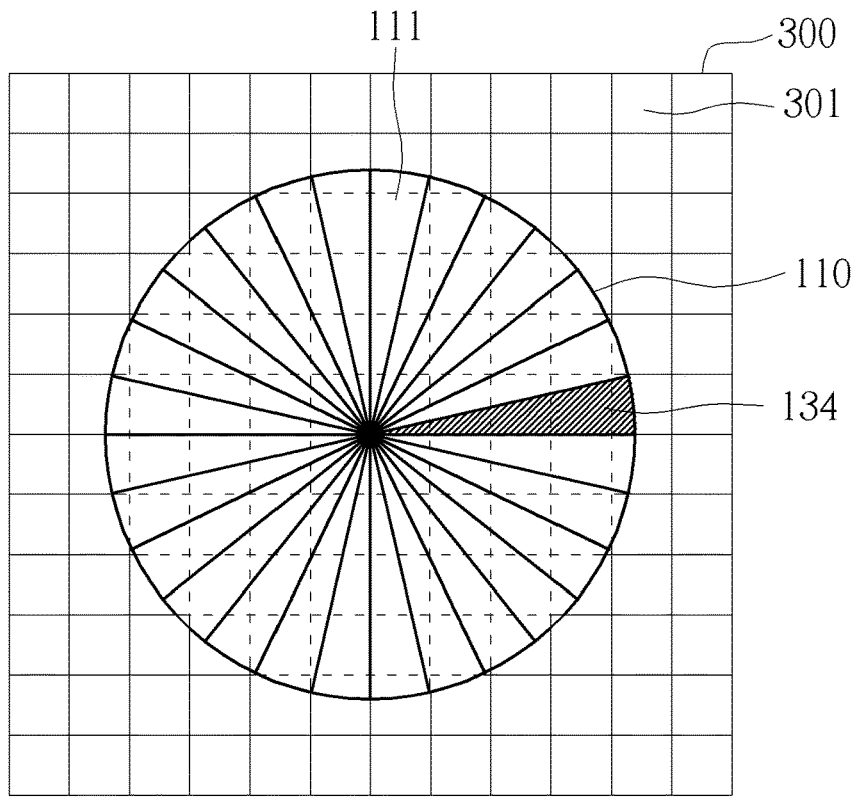
FIG. 5 is a diagram illustrating a single sensing pad arranged according to a single fan-shaped area of an orthographic projection of the knob cover according to an embodiment of the present invention.
Figure 6:
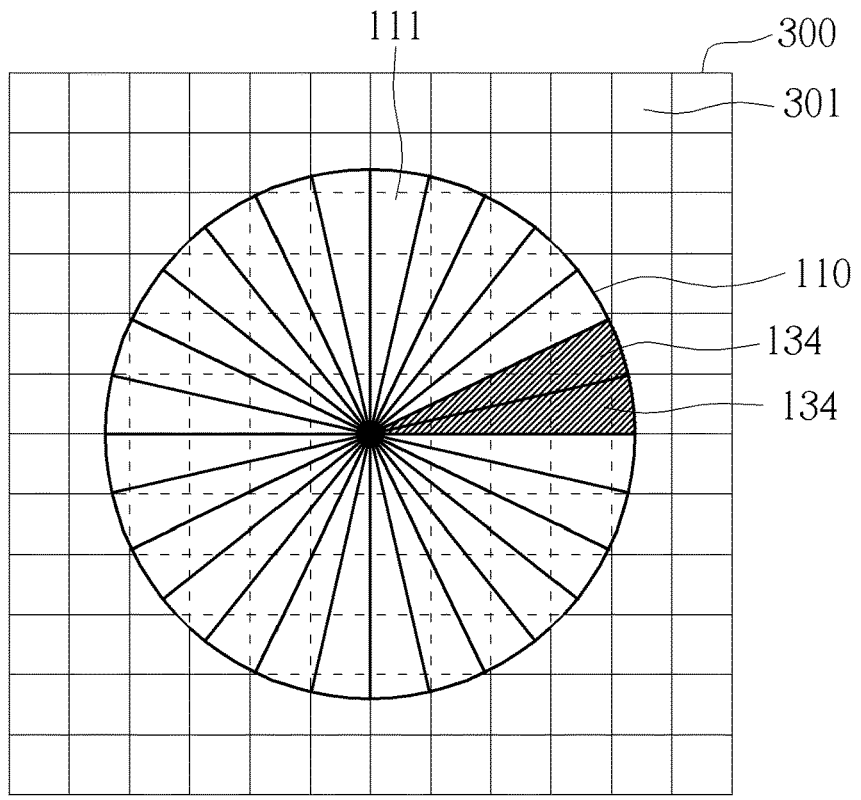
FIG. 6 a diagram illustrating two sensing pads arranged according to two adjacent fan-shaped areas of the orthographic projection of the knob cover according to the first embodiment of the present invention.

Please refer to FIG. 5 in conjunction with FIG. 6. FIG. 5 is a diagram illustrating a single sensing pad 134 arranged according to a single fan-shaped area of an orthographic projection of the knob cover 110 according to the first embodiment of the present invention. FIG. 6 is a diagram illustrating two sensing pads 134 arranged according to two adjacent fan-shaped areas of the orthographic projection of the knob cover 110 according to the first embodiment of the present invention. As shown in FIG. 5, an orthographic projection of the knob cover 110 on the touch panel 300 is divided into a plurality of parts 111 that are distributed radially from a center of the orthographic projection of the knob cover 110. The number of the plurality of parts 111 depends on the resolution of the rotation angle of the knob device 100. Each sensing pad 134 is a sector full-filled one fan-shaped area of the plurality of parts 111. For example, in the present embodiment, the orthographic projection of the knob cover 110 on the touch panel 300 is equally divided into 28 parts 111 each being a fan-shaped area, and one of the plurality of sensing pads 134 is fan-shaped and formed according one part 111. However, this is for illustrative purposes only, and is not meant to be a limitation of the present invention. Alternatively, the orthographic projection of the knob cover 110 on the touch panel 300 may be divided unequally, depending upon the design considerations.

As shown in FIG. 6, in the present embodiment, the rotation sensing element 130 comprises more than one sensing pad (e.g., two sensing pads 134), and each sensing pad 134 is located in a part 111 and connected to another sensing pad 134 located in another part 111 adjacent to the part 111. When two sensing pads 134 are arranged on two adjacent parts 111, more touch panel cells 301 are covered by a sensing pad design having more sensing pads 134, such that resolution of the rotation angle of the knob device 100 is improved. For example, if the knob device 100 is rotated a little bit, the touching panel cells 301 covered by the single sensing pad 134 in FIG. 5 may still be the same, and the sensing pad 134 has not been rotated to a position above other touching panel cells 301. In contrast to the sensing pad design having only a single sensing pad 134, a sensing pad design having multiple sensing pads 134 in FIG. 6 covers more touching panel cells 301. Therefore, as the knob device 100 is rotated a little bit, the plurality of sensing pads 134 can cover other touching panel cells 301, such that the touch panel 300 can obtain a rotation sensing signal of a slight rotation.

Figure 7:
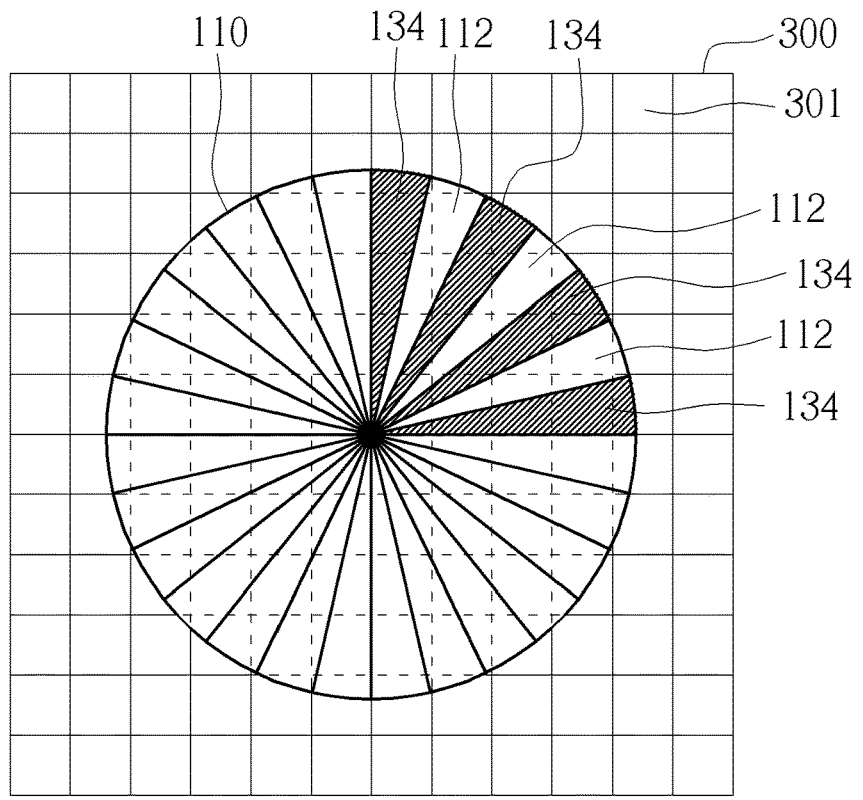
FIG. 7 is a diagram illustrating a plurality of sensing pads separately arranged according to the fan-shaped areas of the orthographic projection of the knob cover according to an embodiment of the present invention.
Figure 8:
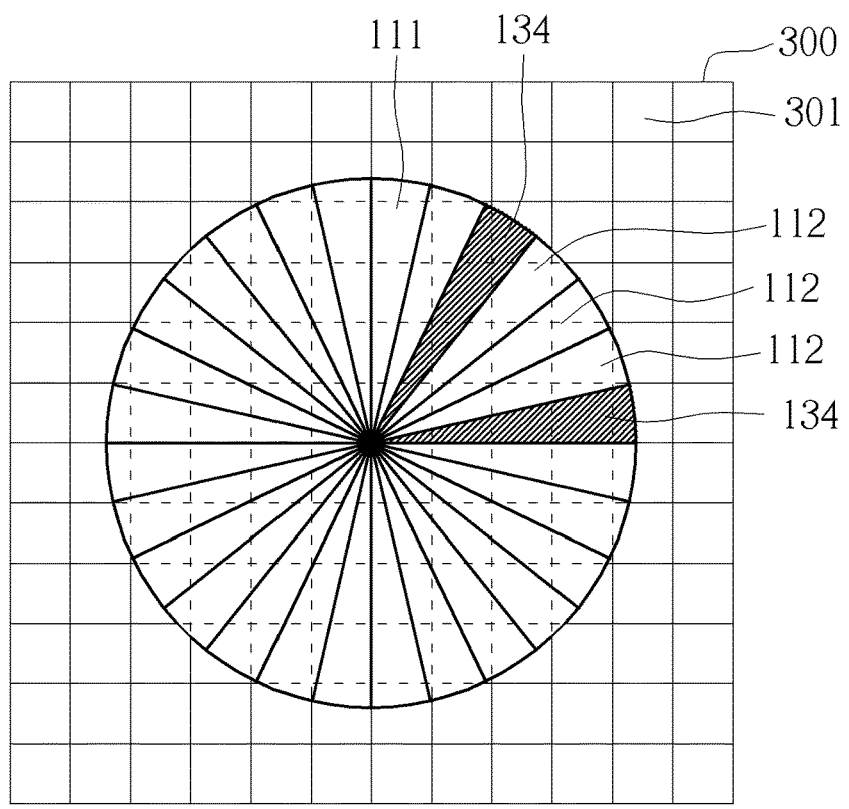
FIG. 8 is a diagram illustrating two sensing pads separately arranged according to two fan-shaped areas of the orthographic projection of the knob cover according to an embodiment of the present invention.

The sensing padding design using multiple sensing pad 134 may have some variations to meet different requirements. In some embodiments, a gap part 112 of the orthographic projection of the knob cover 110 may be formed between two sensing pads 134 to ensure that one sensing pad 134 is separated from another sensing pad 134. Please refer to FIG. 7. FIG. 7 is a diagram illustrating a plurality of sensing pads 134 separately arranged according to the fan-shaped areas of the orthographic projection of the knob cover 110 according to an embodiment of the present invention. As shown in FIG. 7, each sensing pad 134 is located in a part 111 and not connected to another sensing pad 134, a gap part 112 of the plurality of parts 111 of the orthographic projection of the knob cover 110 is located between two of the plurality of sensing pads 134. In other words, a rotation sensing element in FIG. 7 has four sensing pads 134 located separately. Three gap parts 112 are located between the four sensing pads 134 to separate the sensing pads 134. The separated sensing pads 134 may cover more touching panel cells 301, such that resolution of the rotation angle of the knob device is improved. Please further refer to FIG. 8. FIG. 8 is a diagram illustrating two sensing pads 134 separately arranged according to two fan-shaped areas of the orthographic projection of the knob cover 110 according to an embodiment of the present invention. As shown in FIG. 8, in some embodiments, a gap part 112 is connected to another gap part 112. For example, a rotation sensing element in FIG. 8 has two sensing pads 134 located separately. Three gap parts 112 are connected and located between the two sensing pads 134 to separate the two sensing pads 134. The separated sensing pads 134 may cover more touching panel cells 301, such that the touch panel 300 can obtain a rotation sensing signal of a slight rotation.

According to the above arrangements, each sensing pad is formed according to one of the fan-shaped areas of the orthographic projection of the knob cover, in order to cover more touching panel cells as possible. Furthermore, the adjacent sensing pad and/or the separated sensing pad may also be arranged to increase the number of the touching panel cells under the plurality of sensing pads. When a small angle of rotation can make the plurality of sensing pads cover different touching panel cells, the resolution of the rotation angle of the knob device 100 is improved.

Figure 9:
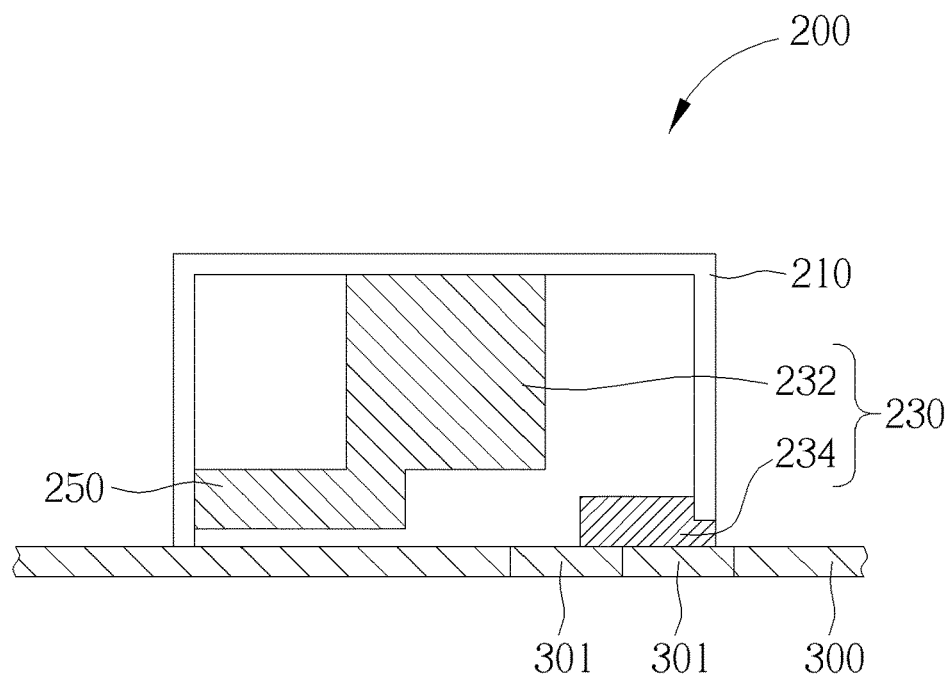
FIG. 9 is a cross-sectional view illustrating a knob device arranged on the touch panel according to a second embodiment of the present invention.

Please refer to FIG. 9. FIG. 9 is a cross-sectional view illustrating a knob device 200 arranged on the touch panel 300 according to a second embodiment of the present invention. Like the knob device 100 of the first embodiment of the present invention, the knob device 200 of the second embodiment of the present invention comprises a knob cover 210, a rotation sensing element 230 and a pressing sensing element 250 both arranged between the touch panel 300 and the knob cover 210, as shown in FIG. 9. The rotation sensing element 230 comprises a plurality of sensing pads 234 and a base 232. The difference between the second embodiment and the first embodiment is that the plurality of sensing pads 234 are arranged on the knob cover 210 and the pressing sensing element 250 is connected to the base 232. When the knob device 200 is rotated by a user, the plurality of sensing pads 234 and the pressing sensing element 250 are simultaneously rotated with the knob device 200. Similarly, when the user touches and presses the knob cover 210 of the knob device 200 of the second embodiment, the pressing sensing element 250 abuts against or gets close to the touch panel 300, such that the touch panel cell(s) 301 under the pressing sensing element 250 generate pressing sensing signal(s) in response to the pressing sensing element 250. For example, based on the sensing signal (s) output from the touch panel cell(s) 301, the touch panel 300 generates a pressing sensing signal in response to the user touching and pressing the knob cover 210 of the knob device 200. Furthermore, when the user touches and rotates the knob cover 210 of the knob device 200 of the second embodiment, the touch panel cell (s) 301 under the plurality of sensing pads 234 generates sensing signal(s) in response to a location of the plurality of sensing pads 234. For example, based on the sensing signal(s) output from the touch panel cell(s) 301, the touch panel 300 generates a rotation sensing signal in response to the user touching and rotating the knob cover 210 of the knob device 200.

Figure 10:
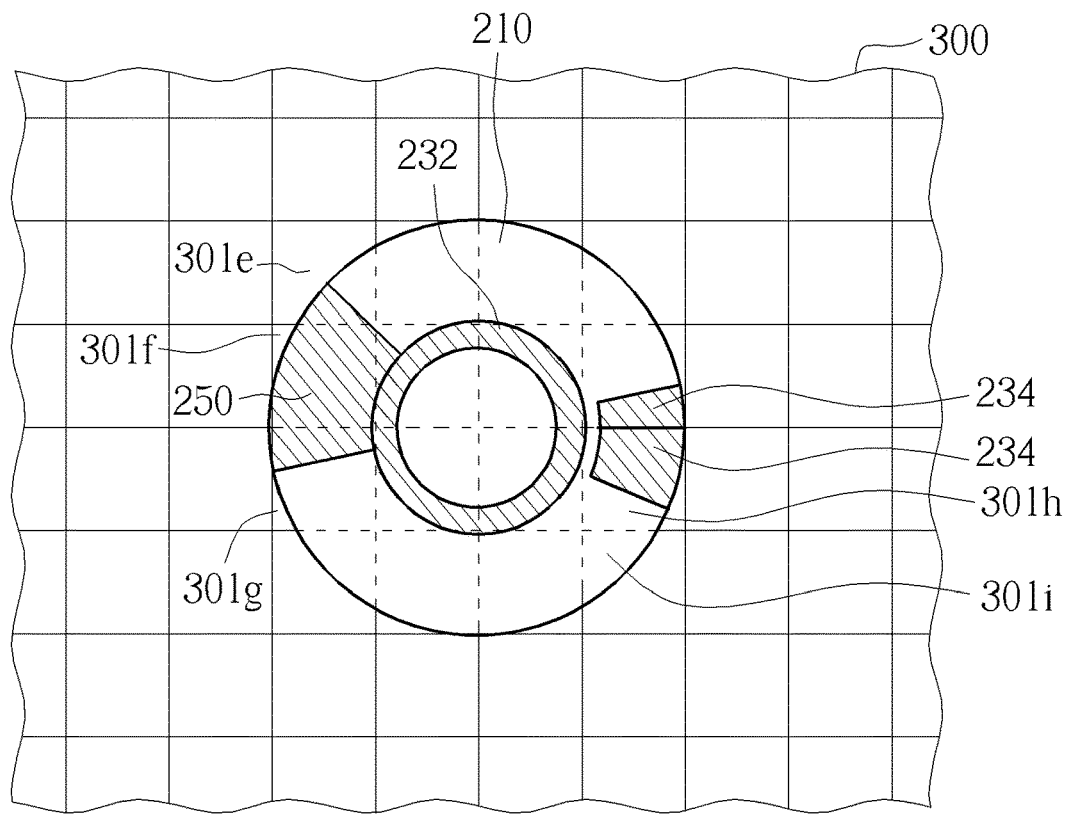
FIG. 10 is a top view illustrating the knob device arranged on the touch panel according to the second embodiment of the present invention.

Please refer to FIG. 10. FIG. 10 is a top view illustrating the knob device 200 arranged on the touch panel 300 according to the second embodiment of the present invention. As shown in FIG. 10, the plurality of sensing pads 234 are arranged on the knob cover 210 and lack an area around a center of the orthographic projection of the knob cover 210. Assume that when the user touches and presses the knob cover 210 of the knob device 200, three touch panel cells 301e, 301f and 301g are under the pressing sensing element 250, such that the three touch panel cells 301e, 301f and 301g generate three sensing signals. The touch panel 300 (particularly, a controller of the touch panel 300) can be pre-programed for generating the pressing sensing signal when receiving three sensing signals generated from three adjacent touch panel cells. Similarly, when the user touches the knob cover 210 of the knob device 200, a touch panel cell 301h is under the plurality of sensing pads 234, such that the touch panel cell 301h generates a sensing signal which represents that the knob device 200 is touched. If the user rotates the knob cover 210 of the knob device 200 clockwise, the plurality of sensing pads 234 is moved to a position above a touch panel cell 301i, such that the touch panel cell 301i is under the plurality of sensing pads 234 and generates a sensing signal. The touch panel 300 (particularly, a controller of the touch panel 300) can be pre-programed for generating a rotation sensing signal which represents that the knob device 200 is rotated when firstly receiving a sensing signal generated from one touch panel cell (e.g., touch panel cell 301h in this embodiment) and then receiving a sensing signal generated from another touch panel cell (e.g., touch panel cell 301i in this embodiment). It is noticed that the three touch panel cells 301e, 301f and 301g are probably covered by the plurality of sensing pads 234. Therefore, the difference between the area of the pressing sensing element 250 and the area of the plurality of sensing pads 234 is greater, such that the misjudgments between pressing and turning are fewer. Furthermore, when the user rotates the knob cover 210 of the knob device 200 clockwise, a part of the sensing pad 234 that is farthest from the center of the orthographic projection of the knob cover 210 first covers the touch panel cell 301i. Therefore, the area of the sensing pad 234 far from the center of the orthographic projection of the knob cover 210 can effectively increase the resolution of the rotation angle of the knob device 200.

Figure 11:
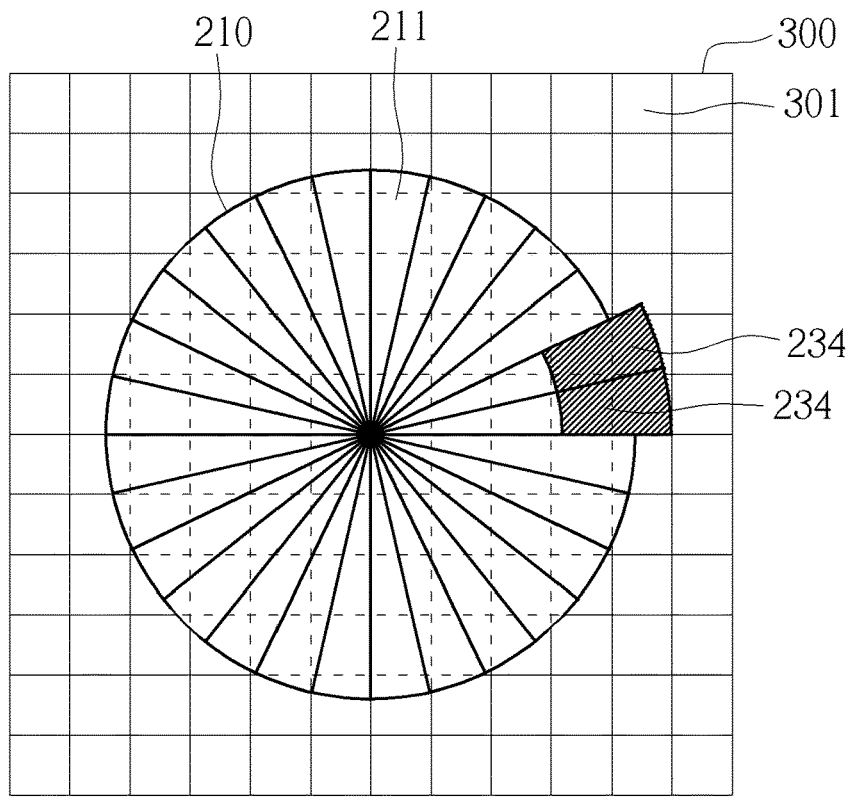
FIG. 11 is a diagram illustrating two sensing pads arranged according to two adjacent fan-shaped areas of the orthographic projection of the knob cover according to the second embodiment of the present invention.

In the present embodiment, the plurality of sensing pads 234 are arranged on the knob cover 110. The sensing pad design using multiple sensing pads 234 may have some variations to meet different requirements. Please refer to FIG. 11. FIG. 11 is a diagram illustrating two sensing pads 234 arranged according to two adjacent fan-shaped areas of the orthographic projection of the knob cover 210 according to an embodiment of the present invention. Similarly, an orthographic projection of the knob cover 210 on the touch panel 300 is divided into a plurality of parts 211 that are distributed radially from the center of the orthographic projection of the knob cover 210. The number of the plurality of parts 211 depends on the resolution of the rotation angle of the knob device 200. For the plurality of sensing pads 234 being arranged on the knob cover 210, the part of the sensing pads 234 far from the center may be increased. In some embodiments, the plurality of sensing pads 234 may extend out from the knob cover 210. As shown in FIG. 11, a set of sensing pads 234 in FIG. 11 is formed by two sensing pads 234 located on an area far from the center in one fan-shaped area of an orthographic projection of the knob cover 210, and is further extended out of the orthographic projection of the knob cover 210, in order to cover more touch panel cells 301. In other words, the plurality of sensing pads 234 have a first part and a second part connected with the first part, where The first part is located in one of the plurality of parts, and the second part is located outside of the orthographic projection of the knob cover 211. It is noticed that the part of the sensing pads 234 extended from the knob cover 210 may be seen by the user and may block a part of the screen.

Figure 12:
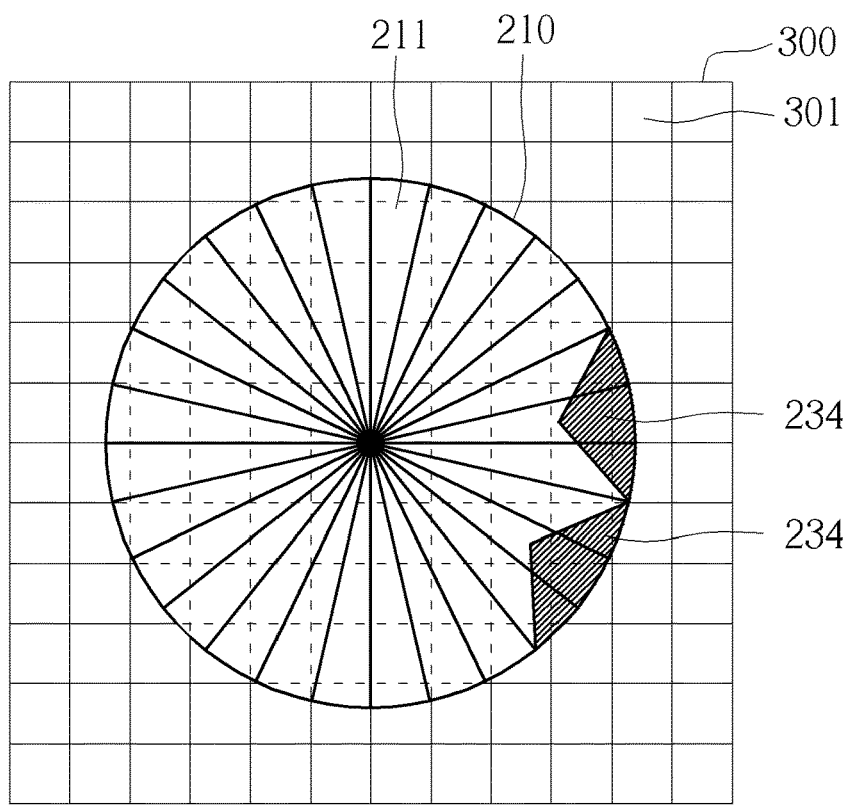
FIG. 12 is a diagram illustrating two sensing pads arranged according to two adjacent fan-shaped areas of the orthographic projection of the knob cover according to an embodiment of the present invention.

In some embodiments, each sensing pad 234 is formed on an area far from the center of a plurality of fan-shaped area of an orthographic projection of the knob cover 210. Please refer to FIG. 12. FIG. 12 is a diagram illustrating two sensing pads 234 arranged according to two adjacent fan-shaped areas of the orthographic projection of the knob cover 210 according to an embodiment of the present invention. For example, as shown in FIG. 12, a set of sensing pads 234 in FIG. 12 is a sector formed according three parts 211 located on an area far from the center in the three parts 211, the area of the set of sensing pads 234 far from the center is enlarged, and the area of the set of sensing pads 234 close to the center is reduced. Further another set of sensing pads 234 is located in another three parts 111 and connected to the set of sensing pad located in the three parts 211 adjacent to the another three parts 211. In this way, the area of sensing pads 234 far from the center is increased to cover more touch panel cells 301, and the area of sensing pads 234 around the center is reduced to make the rotation sensing element 230 and the pressing sensing element 250 have an enough difference, to prevent the misjudgment between rotating detected by the rotation sensing element 230 and pressing detected by the pressing sensing element 250.

Figure 13:
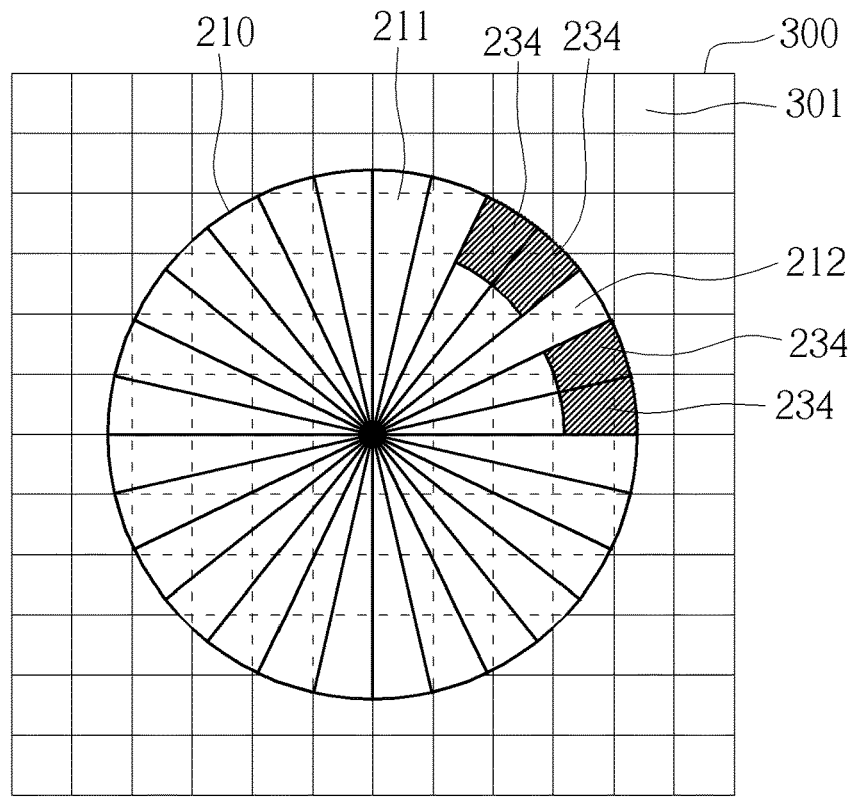
FIG. 13 is a diagram illustrating two sets of sensing pads arranged according to a plurality of fan-shaped areas of the orthographic projection of the knob cover according to an embodiment of the present invention.
Figure 14:
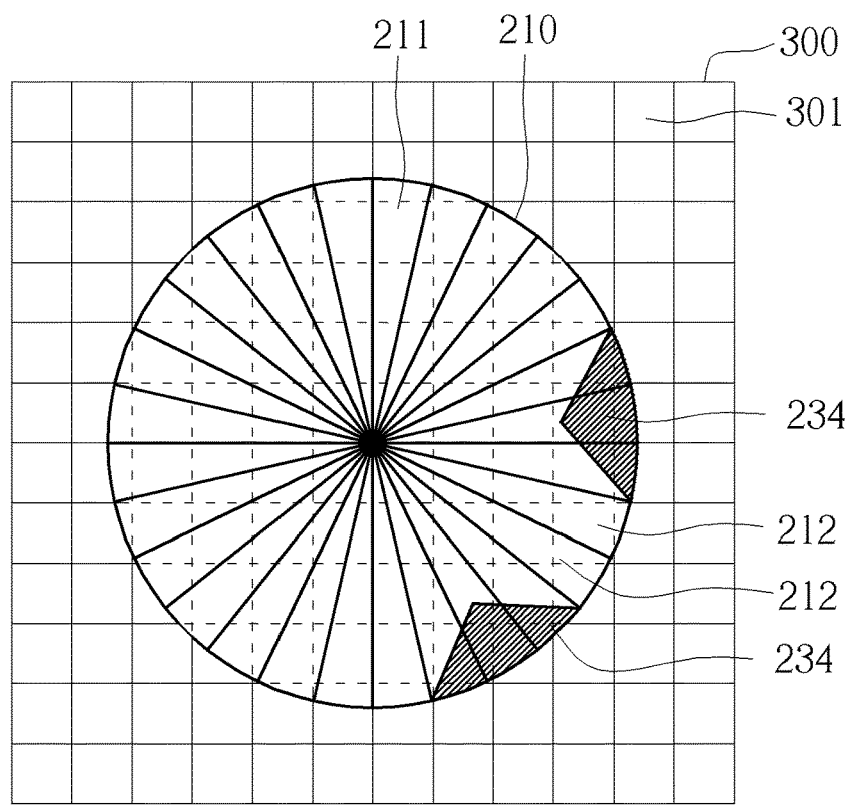
FIG. 14 is a diagram illustrating two sets of sensing pads separately arranged according to a plurality of fan-shaped areas of the orthographic projection of the knob cover according to an embodiment of the present invention.

In some embodiments, a gap part 212 of the orthographic projection of the knob cover 210 is formed between two sets of sensing pads 234 to make one set of sensing pads 234 separated from another set of sensing pads 234. Please refer to FIG. 13. FIG. 13 is a diagram illustrating two sets of sensing pads 234 arranged according to a plurality of fan-shaped areas of the orthographic projection of the knob cover 210 according to an embodiment of the present invention. As shown in FIG. 13, a set of sensing pads 234 in FIG. 13 is formed by two sensing pads 234 located on an area far from the center in one fan-shaped area of an orthographic projection of the knob cover 210, a gap part 112 of the plurality of parts 111 of the orthographic projection of the knob cover 110 is located between two sets of sensing pads 234. In other words, one gap part 212 is located between the two sets of sensing pads 234 to separate the plurality of sensing pads 134. The separated sensing pads 234 may cover more touching panel cells 301, such that resolution of the rotation angle of the knob device is improved. Please further refer to FIG. 14. FIG. 14 is a diagram illustrating two sets of sensing pads 234 separately arranged according to a plurality of fan-shaped areas of the orthographic projection of the knob cover 211 according to the second embodiment of the present invention. As shown in FIG. 14, in some embodiments, a gap part 212 is connected to another gap part 212. For example, a set of sensing pads 234 in FIG. 14 is a sector formed according three parts 211 located on an area far from the center in the three parts 211, the area of the set of sensing pads 234 far from the center is enlarged, and the area of the set of sensing pads 234 close to the center is reduced. Two gap parts 212 are connected and located between two sets sensing pads 134 to separate the plurality of sensing pads 234. The separated sensing pads 234 may cover more touching panel cells 301, such that the touch panel 300 can obtain a rotation sensing signal of a slight rotation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A knob device, applicable to a touch panel, the knob device comprising:
 a knob cover; and
 a rotation sensing element, comprising a base and a plurality of sensing pads arranged on at least one of the knob cover and the base, wherein the rotation sensing element is arranged between the touch panel and the knob cover, the base is connected to the knob cover;

wherein when a user touches the knob device, the touch panel generates a rotation sensing signal in response to a location of the plurality of sensing pads;

wherein an orthographic projection of the knob cover on the touch panel is divided into a plurality of parts, the plurality of parts are distributed radially from a center of the orthographic projection of the knob cover, each sensing pad is located in a part and connected to another sensing pad located in another part adjacent to the part.

2. The knob device of claim 1, wherein each part of the orthographic projection of the knob cover is a fan-shaped area.

3. The knob device of claim 2, wherein each sensing pad is a sector full-filled one fan-shaped area of the plurality of parts.

4. The knob device of claim 1, wherein each sensing pad comprises a first part and a second part connected with the first part, the first part is located in one of the plurality of parts, the second part is located outside of the orthographic projection of the knob cover.

5. The knob device of claim 1, further comprising a pressing sensing element arranged between the knob cover and the touch panel and connected to at least one of the knob cover and the base, wherein the pressing sensing element is located above the touch panel, when the user touches and presses the knob device, the pressing sensing element abuts against or gets close to the touch panel, such that the touch panel generates a pressing sensing signal in response to the pressing sensing element.

6. The knob device of claim 5, wherein an orthographic projection of the pressing sensing element on the touch panel is greater than an orthographic projection of one of the plurality of sensing pads on the touch panel.

7. The knob device of claim 5, wherein the pressing sensing element and the plurality of sensing pads are not overlapped with each other.

8. A knob device, applicable to a touch panel, the knob device comprising:
a knob cover; and
a rotation sensing element, comprising a base and a plurality of sensing pads connected to at least one of the knob cover and the base, wherein the rotation sensing element is arranged between the touch panel and the knob cover, the base is connected to the knob cover;

wherein when a user touches the knob device, the touch panel generates a rotation sensing signal in response to a location of the plurality of sensing pads;

wherein an orthographic projection of the knob cover on the touch panel is divided into a plurality of parts, the plurality of parts are distributed radially from a center of the orthographic projection of the knob cover, each sensing pad is located in a part and not connected to another sensing pad, a gap part of the plurality of parts of the orthographic projection of the knob cover is located between two of the plurality of sensing pads.

9. The knob device of claim 8, wherein each part of the orthographic projection of the knob cover is a fan-shaped area.

10. The knob device of claim 9, wherein each sensing pad is a sector full-filled one fan-shaped area of the plurality of parts.

11. The knob device of claim 8, wherein each sensing pad comprises a first part and a second part connected with the first part, the first part is located in one of the plurality of parts, the second part is located outside of the orthographic projection of the knob cover.

12. The knob device of claim 8, further comprising a pressing sensing element arranged between the knob cover and the touch panel and connected to at least one of the knob cover and the base, wherein the pressing sensing element is located above the touch panel, when the user touches and presses the knob device, the pressing sensing element abuts against or gets close to the touch panel, such that the touch panel generates a pressing sensing signal in response to the pressing sensing element.

13. The knob device of claim 12, wherein an orthographic projection of the pressing sensing element on the touch panel is greater than an orthographic projection of one of the plurality of sensing pads on the touch panel.

14. The knob device of claim 12, wherein the pressing sensing element and the plurality of sensing pads are not overlapped with each other.

* * * * *